United States Patent
Nofsinger et al.

[11] Patent Number: 5,365,904
[45] Date of Patent: Nov. 22, 1994

[54] REDUNDANT SPEED SENSOR FOR ENGINE CONTROL

[75] Inventors: Stephen C. Nofsinger; Siamak Mirhakimi, both of Peoria, Ill.

[73] Assignee: Caterpillar Inc., Peoria, Ill.

[21] Appl. No.: 96,740

[22] Filed: Jul. 23, 1993

[51] Int. Cl.$^5$ .................. F02D 31/00; F02M 51/00
[52] U.S. Cl. ........................... 123/359; 123/479
[58] Field of Search ........... 123/352, 359, 479, 198 D

[56] References Cited

U.S. PATENT DOCUMENTS

| | | | |
|---|---|---|---|
| 4,368,705 | 1/1983 | Stevenson et al. | 123/357 |
| 4,928,242 | 5/1990 | Suzuki | 123/479 |
| 4,941,445 | 7/1990 | Deutsch | 123/479 |
| 4,989,569 | 2/1991 | Eidler | 123/359 |
| 5,065,721 | 11/1991 | Wiggins et al. | 123/479 |

*Primary Examiner*—E. Rollins Cross
*Assistant Examiner*—Thomas N. Moulis
*Attorney, Agent, or Firm*—R. Carl Wilbur

[57] ABSTRACT

A control system for controlling an internal combustion engine is disclosed. The control system employs closed loop engine speed control and includes a primary and secondary engine speed sensor. An electronic control module detects a failure of the primary or secondary sensor and causes the other sensor to be used as the engine speed feedback signal in the closed loop control.

6 Claims, 3 Drawing Sheets

REDUNDANT SPEED SENSOR FOR ENGINE CONTROL

TECHNICAL FIELD

The present invention relates to a control system used with an internal combustion engine. More specifically, the present invention relates to a control system that permits continued engine operation even after a failure of an engine speed sensor.

BACKGROUND OF THE INVENTION

Electronic control modules are often used to control the output of an internal combustion engine. A typical control scheme used by such a module might involve both closed loop engine speed control and closed loop rack position control within the engine speed control loop. A known electronic control module is disclosed in U.S. Pat. No. 4,368,705, issued to Stevenson et. al. on Jan. 18, 1983.

In a control module such as disclosed in U.S. Pat. No. 4,368,705, a throttle position signal, which corresponds to a desired engine speed, is provided as a command input. An engine speed sensor is located on the engine and produces a feedback signal to the control module. An engine speed error signal is calculated as the difference between the actual engine speed feedback signal and the throttle signal. The error signal is input to an engine speed controller which calculates a desired rack position signal and inputs that command to the rack position loop.

Known control modules often place the rack position loop within the engine speed loop. The desired rack position signal produced by the engine speed control loop is an input command to the rack position loop. A position sensor is located on the rack which produces a rack position feedback signal. A rack position error signal is calculated as the difference between the desired rack position command and the actual rack position. The rack position error is an input to the rack controller which in turn develops an actuator signal that is delivered to the rack actuator motor to drive the rack position error signal to zero (i.e., so that the actual rack position equals the desired rack position).

The engine speed feedback signal is critical in closed loop engine speed control systems. If the engine speed sensor fails or the electrical connection between the sensor and the controller is compromised, no engine speed feedback signal will be present at the controller. Then, because there is no actual engine speed signal to subtract from the desired engine speed command, the engine speed error signal will equal the throttle command and it will be impossible for the controller to drive the engine speed error signal to zero. The controller will continue to command increased output from the engine regardless of the engine's actual speed. The engine will eventually exceed its maximum operating speed and break down. In most closed loop engine speed controls, to prevent engine damage, the controller will prevent the engine from operating when the engine speed feedback signal is not present.

However, completely shutting an engine down may be undesirable in some applications. For example, in a marine application, leaving a boat without power prevents it from maneuvering according to surface conditions, weather, etc. The present invention is directed toward overcoming one or more of these problems.

SUMMARY OF THE INVENTION

In one aspect of the invention, two engine speed sensors are provided, each sensor having an output engine speed signal. Each engine speed signal is an input to the electronic control module and one of the signals is used as the engine speed feedback signal in the closed loop engine speed control.

The controller of the preferred embodiment of the present invention analyzes the two engine speed signals to determine whether a sensor has failed. If a sensor has failed, the controller automatically substitutes the engine speed signal of the other sensor as the feedback signal in the closed loop control. In this manner, the engine may continue to operate even though there has been an engine speed sensor malfunction or an electrical connection has failed.

Other objects and advantages of the present invention will become apparent from the following detailed description of the invention in conjunction with the drawings and appended claims.

DETAILED DESCRIPTION OF THE INVENTION

Figure 1:
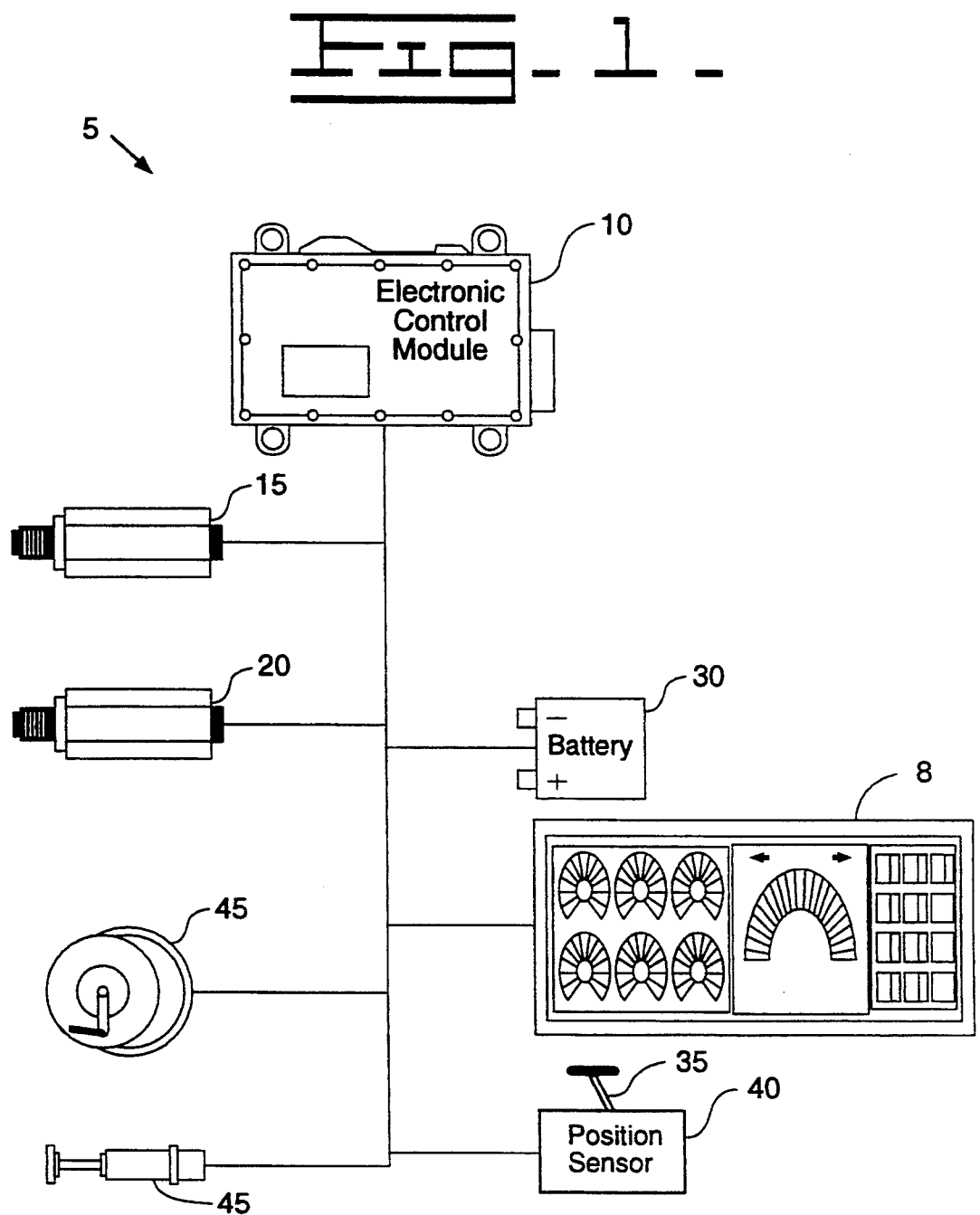
FIG. 1 generally illustrates the connections between an electronic control module and various sensors in a preferred embodiment of the present invention.

Referring first to FIG. 1, a preferred embodiment of the redundant speed sensor system 5 of the present invention is shown. The system includes an electronic control module 10 having inputs from a primary engine speed sensor 15, a secondary engine speed sensor 20, a rack position sensor 25, a battery 30 to supply power to the electronic control module 10 and the various sensors and actuators, a throttle 35, and a throttle position sensor 40. The electronic control module 10 outputs include a signal to the rack actuator 45 to move the rack and signals to the display module 8 to display the engine speed and other engine functions.

To adjust the engine speed, the operator moves the throttle 35 to a position that corresponds to the desired engine output speed. The throttle position sensor 40 senses the throttle position and outputs a signal that is a function of that position. The throttle position signal represents the desired engine speed and is input to the electronic control module 10.

The primary engine speed sensor 15 produces an engine speed signal SPD1 that is a function of the actual engine speed and is an input to the electronic control module 10. Likewise, the secondary speed sensor 20 produces an engine output signal SPD2 that is an input to the electronic control module. In the preferred embodiment, the primary engine speed sensor 15 is an active magnetic pickup sensor and the secondary engine speed sensor 20 is a passive magnetic pickup sensor both of which are well known in the art and therefore will not be described further. Other sensors are well known in the art and could be substituted for the magnetic pickup sensors without deviating from the scope and spirit of the present invention.

The rack position sensor 25 has a rack position signal RPS. The RPS signal is an input to the electronic control module 10. The rack position signal RPS is a feedback signal in the rack position loop implemented in the controller. As will be described below, the controller will develop a rack error signal which will command the actuator to move the rack toward a commanded position. In the preferred embodiment, the rack position sensor is preferably a linear potentiometer that produces a voltage output that is a function of the position of the wiper. Such position sensors are well known in the art. Other position sensors that perform the same function are also known in the art and it is intended that the present invention encompass redundant speed sensor control systems that include other rack position sensors. Implementing a position sensor within the redundant speed sensor system 5 of the present invention would be a mechanical step to one skilled in the art. Thus, such implementation will not be further described.

Figure 2:
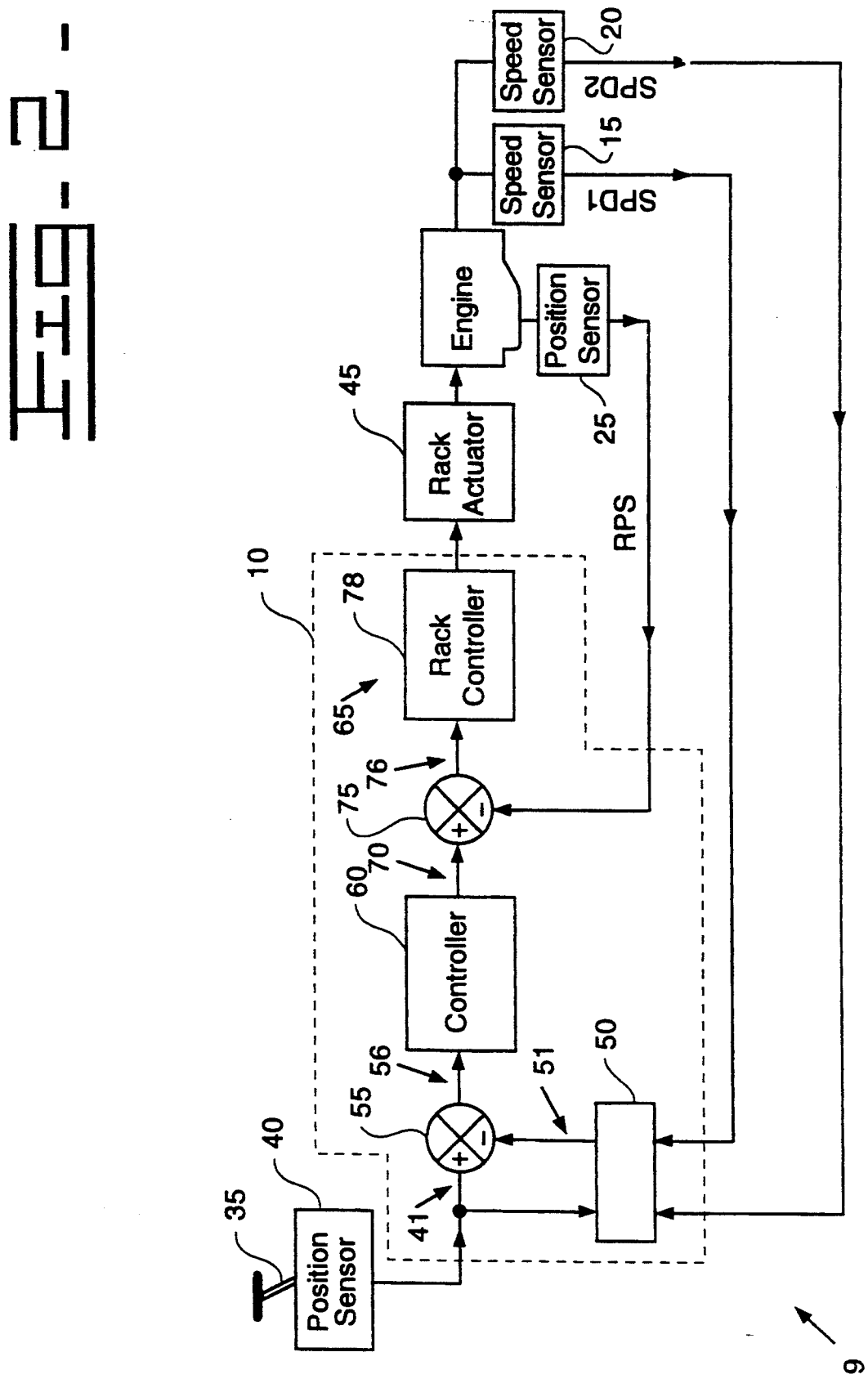
FIG. 2 illustrates in block diagram form the control scheme of the preferred embodiment of the present invention.

Referring now to FIG. 2, the engine control scheme will be described with reference to the components described above and illustrated in FIG. 1. FIG. 2 generally illustrates a closed loop rack position control 65 within an engine speed control loop 9. The operator selects a desired engine speed by moving the throttle 35 to a position corresponding to the desired engine speed. The throttle position sensor 40 produces a desired engine speed signal that is an input to the electronic controller 10 and forms the command signal 41 for the engine speed control loop 9. The primary speed sensor 15 and the secondary speed sensor 20 each produce an engine speed signal SPD1 and SPD2 respectively, that are input to the electronic control module 10. Within the electronic control module 10 is a detection device 50 implemented in software that determines whether a valid engine speed signal SPD1 is being received by the electronic control module 10 from the primary sensor 15. If the detection device determines that the engine speed signal SPD1 is not valid, then it substitutes the output of the secondary sensor 20 (SPD2), into the engine speed control loop as the engine speed feedback signal 51. The software necessary to implement this detection strategy is described below with reference to the flowchart of FIG. 3.

In the summing block 55, the engine speed error signal 56 is calculated as the difference between the command signal 41 (the desired engine speed) and the engine speed feedback signal 51 (the actual engine speed). The engine speed error signal is processed by the controller 60 to calculate a desired rack 70, which will drive the engine speed error signal 56 to zero. The desired rack signal 70 is the command signal for the rack position loop 65, and is an input to the summing Junction 75. The rack position sensor 25 produces a rack position signal RPS which is also an input to the electronic control module 10 and the summing junction 75. The rack position error signal 76 is the difference between the desired rack command 70 and the actual rack position as determined by the rack position signal RPS. The rack controller 78 issues a command signal to the rack actuator 45 to cause the rack to move in a direction that will drive the rack error to zero (i.e. a command that will cause the rack position to approach the commanded position). As can be seen from FIG. 2, when the actual rack position as determined by the rack position signal RPS equals the commanded rack position 70 the rack position error signal 76 from the summing junction 75 will be zero, and the rack will stop moving.

Likewise when the actual engine speed, as determined by the engine speed feedback signal 51, equals the desired engine speed, as selected by the operator at the throttle 35 and issued to the controller as the engine speed command 41, then the engine speed error signal 56 is zero. At that instant the actual engine speed equals the desired engine speed.

As can be appreciated by reference to the drawings, the engine speed feedback signal 51 is critical to the operation of the engine. For example, a typical feedback signal might be one volt per 1000 rpm. If the operator desired an engine speed of 3000 rpm, then the throttle command 41 would be 3 volts. If a feedback signal was being received by the engine control module 10 and the command signal were 3 volts, then the feedback signal would cancel the command when the actual engine speed reached 3000 RPM. At that instant there would be no error signal because the desired and actual speeds would be equal. However, if the engine speed feedback signal were missing, there would be no signal to subtract from the command. The command of 3 volts would be present even when the engine reached 3000 RPM. As can be appreciated, unless the controller prevented the engine from operating, the engine would quickly reach an overspeed condition, thereby damaging the engine.

The present invention overcomes this problem by detecting a failed sensor and automatically substituting a second properly functioning sensor so that the engine speed feedback signal 51 will continue to be present at the summing junction 55. Thus, the present invention allows the engine to continue operating even after the primary sensor 15 fails or the electrical connection between the primary sensor 15 and the electronic control module 10 is otherwise compromised.

Figure 3:
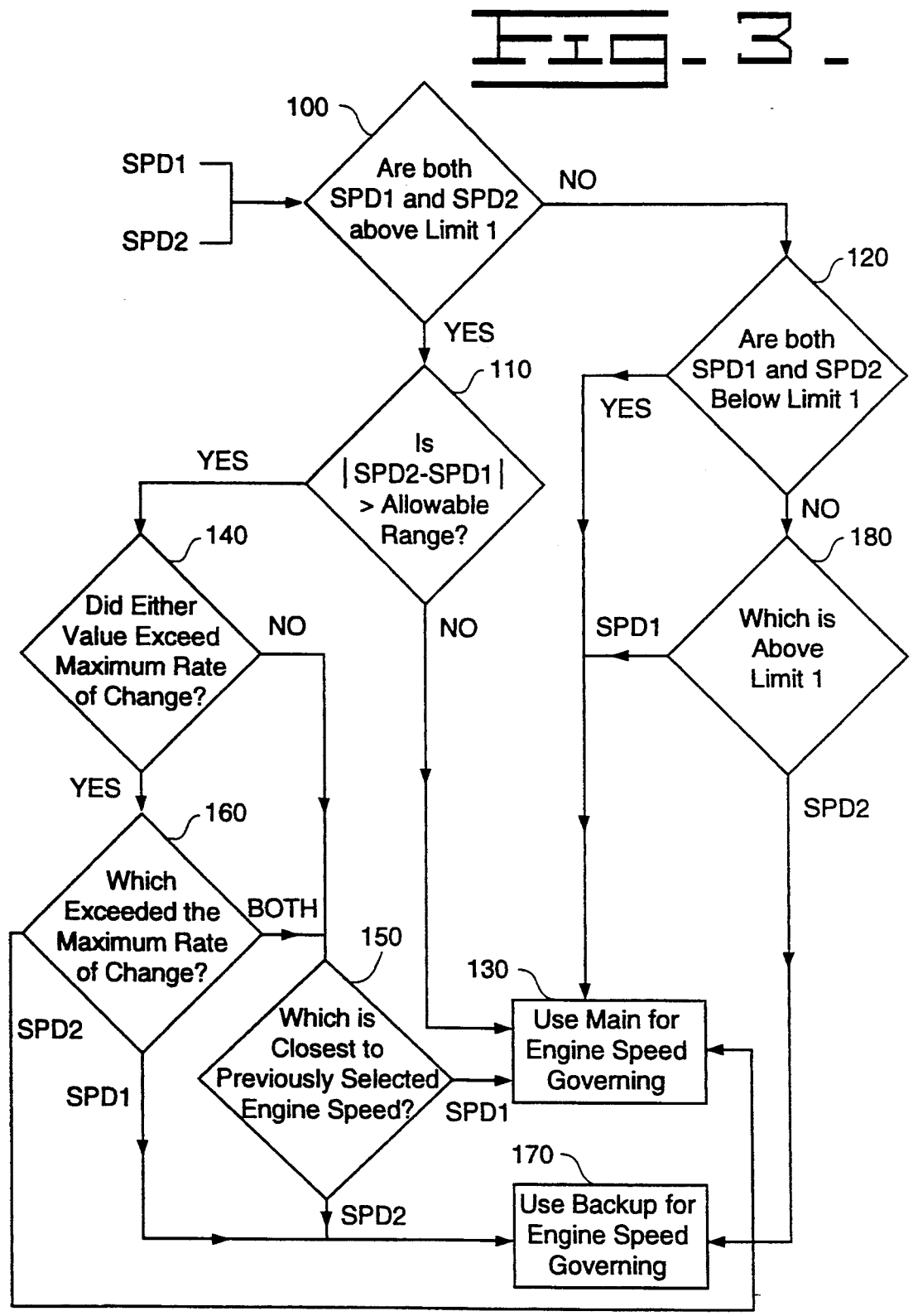
FIG. 3 illustrates a flowchart of the control strategy implemented in software in the electronic control module of the present invention.

Referring now to FIG. 3, a flowchart is shown which details the control strategy implemented in software in the electronic control module 10 of the present invention. The detailed flowchart is adapted for any suitable microprocessor used in an electronic control module. The flowchart represents a complete and workable design of the preferred software program, and has been reduced to practice on a microprocessor. The software may be readily and easily coded from this flowchart using the instruction set associated with this microprocessor, or with the instruction set of other suitable microprocessors. Writing the software from this flowchart is a mechanical step for one skilled in the art.

The engine speed output signals SPD1, SPD2 from the primary sensor 15 and the secondary sensor 20 respectively are inputs to block 100. In block 100, the engine speed signals SPD1, SPD2 are examined to determine whether each engine output signal SPD1, SPD2 has an output corresponding to an engine speed above LIMIT 1 value. In the preferred embodiment, LIMIT 1 represents an engine speed of 40 RPM. However, other values could be easily substituted for LIMIT 1 without deviating from the scope of the present invention. If both signals SPD1, SPD2 are above LIMIT 1, then program control proceeds to block 110. If either of the signals SPD1, SPD2 are below LIMIT 1 then program control proceeds to block 120.

In block 110, the program determines whether the difference between the speed signals SPD1, SPD2 are outside a predetermined allowable range. In the preferred embodiment, the allowable range corresponds to a difference of 20 RPM. However, other allowable ranges may be substituted without deviating from the spirit of the present invention. If the difference between the engine speed signals is within the predetermined allowable range then control passes to block 130, where the software uses the engine speed signal SPD1 of the primary speed sensor 15 as the engine speed feedback signal 51 in the engine speed control loop 9. However, if the difference is greater than the allowable range, then program control passes to block 140.

In block 140, the program determines whether the rate of change of the sensed engine speed (acceleration of the engine) has exceeded a maximum value. A rate of change greater than the maximum value may indicate that the sensor is not working properly. In the preferred embodiment, the maximum value for the rate of change in sensed engine speed is 14,000 RPM/s. However, it can be appreciated that other values may be used while still remaining within the spirit and scope of the present invention. If the rate of change of both signals SPD1, SPD2 does not exceed the maximum value then program control passes to block 150. However, if the rate of change of either of the signals SPD1, SPD2 exceeds the maximum value, then program control passes to block 160.

In block 150, the program determines which of the signals SPD1 or SPD2 is closest to the commanded engine speed as selected by the operator. This determines which signal more accurately reflects the actual engine speed. If signal SPD1 is closest to the selected engine speed, then control passes to block 130, and signal SPD1 from the primary engine speed sensor 15 is used as the feedback signal 51 in the engine speed control loop 9. Otherwise, if signal SPD2 is closest to the selected engine speed, then program control passes to block 170 where signal SPD2 from the secondary engine speed sensor 20 is used as the feedback signal 51 in the engine speed control loop 9.

In block 160, the program determines which of signals SPD1, SPD2 had a rate of change that exceeded the predetermined maximum value. If the rate of change of signal SPD1 exceeded the maximum value, then program control passes to block 170 where signal SPD2 from the secondary engine speed sensor 20 is used as the feedback signal 51 in the engine speed control loop. If the rate of change of signal SPD1 exceeded the maximum value then program control passes to block 130, and signal SPD1 from the primary engine speed sensor 15 is used as the feedback signal 51 in the engine speed control loop.

Returning to the top of the flowchart of FIG. 3, when either of the signals SPD1, SPD2 is below LIMIT 1 (40 MPH in the preferred embodiment), then program control passes to block 120. In block 120, if both signals SPD1, SPD2 are below LIMIT 1, then control passes to block 130, and signal SPD1 from the primary speed sensor 15 is used in as the feedback signal 51 the engine speed control loop. If only one of the signals SPD1, SPD2 is below LIMIT 1, then control passes to block 180. In block 180 the program determines which of the signals SPD1, SPD2 is above LIMIT 1. If SPD1 is above LIMIT 1 then program control passes to block 130, and signal SPD1 from the primary engine speed sensor 15 is used as the engine feedback signal 51 in the engine speed control loop 9. However, if SPD2 is above LIMIT 1 then program control passes to block 170 and output signal SPD2 from the secondary engine speed sensor 20 is used as the engine speed feedback signal 51 in the engine speed control loop.

We claim:

1. An engine control system for an internal combustion engine having an electronic control module that employs closed loop engine speed control, comprising:
   a throttle connected to the electronic control module;
   a primary engine speed sensor having a first engine speed signal as an output wherein said primary sensor is electrically connected to the electronic control module;
   a secondary engine speed sensor having a second engine speed signal as an output wherein said secondary sensor is electrically connected to the electronic control module;
   detecting means for detecting a failure of the primary engine speed sensor or the secondary engine speed sensor;
   a throttle position sensor connected to said throttle wherein said throttle position sensor produces a throttle position signal corresponding to a desired engine speed; and
   wherein said electronic control module calculates a closed loop difference signal as a function of a difference between the second engine speed signal and the desired engine speed signal when said detecting means indicates the primary engine speed sensor has malfunctioned, said closed loop difference signal being a function of a difference between the first engine speed signal and the desired engine speed signal when said primary engine speed sensor has not malfunctioned.

2. A method for controlling an internal combustion engine having an engine control module employing closed loop engine speed control, a throttle, a primary engine speed sensor having an output signal, a secondary engine speed sensor having an output signal, a throttle position sensor having a desired engine speed output, and sensor failure detection means, comprising the steps of:
   sensing the primary engine speed sensor output;
   sensing the secondary engine speed sensor output;
   comparing said primary engine speed sensor output and said secondary engine speed output to a first predetermined limit;
   producing a failure signal as a function of a difference between said primary engine speed sensor output and said secondary engine speed sensor output;
   comparing said failure signal to a predetermined range;
   measuring a rate of change of said speed sensor output and said secondary engine speed sensor output;
   comparing said measured rate of change of said primary engine speed sensor output and said secondary engine speed sensor output to a maximum rate of change limit; and
   using the primary engine speed sensor output as the closed loop engine speed feedback signal in response to said failure signal falling within said predetermined range and 3. The method according to claim 2 including the steps of:
   using said secondary engine speed sensor output as the closed loop engine speed feedback signal in response to said failure signal falling with said predetermined range and said measured rate of change of said primary engine speed sensor output exceeding said maximum rate of change limit.

4. The method according to claim 2 including the steps of:
- sensing the desired engine speed output of said throttle position sensor;
- comparing said primary engine speed sensor output and said secondary engine speed sensor output to a function of said desired engine speed output;
- determining whether the primary engine speed sensor output is closer to said desired engine speed output than the secondary engine speed output is to said desired engine speed output and responsively producing a primary sensor closer signal;
- using the primary engine speed sensor output as the closed loop engine speed feedback signal in response to said failure signal falling within said predetermined range, to the rate of change of both said primary and said secondary engine speed sensor outputs exceeding said maximum rate of change and the production of said primary sensor closer signal.

5. The method according to claim 2 including the steps of:
- sensing the desired engine speed output of said throttle position sensor;
- comparing said primary engine speed sensor output and said secondary engine speed sensor output to a function of said desired engine speed output;
- determining whether the secondary engine speed sensor output is closer to said desired engine speed output than the primary engine speed output is to said desired engine speed output and responsively producing a secondary sensor closer signal;
- using the secondary engine speed sensor output as the closed loop engine speed feedback signal in response to said failure signal falling within said predetermined range, to the rate of change of both said primary and said secondary engine speed sensor outputs exceeding said maximum rate of change and the production of said secondary sensor closer signal.

6. A method for controlling an internal combustion engine having an engine control module employing closed loop engine speed control, a throttle, a primary engine speed sensor having an output signal, a secondary engine speed sensor having an output signal, a throttle position sensor having a desired engine speed output, and sensor failure detection means, comprising the steps of:
- sensing the primary engine speed sensor output;
- sensing the secondary engine speed sensor output;
- comparing said primary engine speed sensor output and said secondary engine speed sensor output to a first predetermined limit;
- producing a failure signal as a function of a difference between said primary engine speed sensor output and said secondary engine speed sensor output;
- comparing said failure signal to a predetermined range;
- using said primary engine speed sensor output as the closed loop engine speed feedback signal in response to said failure signal falling outside said predetermined range.

* * * * *

UNITED STATES PATENT AND TRADEMARK OFFICE
CERTIFICATE OF CORRECTION

PATENT NO. : 5,365,904

DATED : November 22, 1994

INVENTOR(S) : Stephen C. Nofsinger et al.

It is certified that error appears in the above-identified patent and that said Letters Patent is hereby corrected as shown below:

Column 6, claim 2, line 51, after "said", the words --primary engine-- should be inserted.

Column 6, claim 2, line 60, after "and", insert the following:
--said measured secondary engine speed sensor output rate of change exceeding said maximum rate of change limit.--.

Column 6, claim 3, line 65, "with" should be --within--.

Signed and Sealed this

Twenty-eight Day of February, 1995

Attest:

BRUCE LEHMAN

*Attesting Officer*     *Commissioner of Patents and Trademarks*